(12) United States Patent
Zhou et al.

(10) Patent No.: US 11,133,508 B2
(45) Date of Patent: Sep. 28, 2021

(54) ELECTRODE PLATE INCLUDING CURRENT COLLECTOR HAVING CONDUCTIVE LAYER DISPOSED ON INSULATING LAYER AND PROTECTIVE LAYER DISPOSED ON CONDUTIVE LAYER, AND BATTERY INCLUDING THE SAME

(71) Applicant: Contemporary Amperex Technology Co., Limited, Ningde (CN)

(72) Inventors: Yaru Zhou, Ningde (CN); Qingrui Xue, Ningde (CN); Zige Zhang, Ningde (CN); Miao Jiang, Ningde (CN); Jing Li, Ningde (CN); Wei Li, Ningde (CN); Long Wang, Ningde (CN)

(73) Assignee: Contemporary Amperex Technology Co., Limited

( * ) Notice: Subject to any disclaimer, the term of this patent is extended or adjusted under 35 U.S.C. 154(b) by 127 days.

(21) Appl. No.: 16/374,155

(22) Filed: Apr. 3, 2019

(65) Prior Publication Data
US 2019/0393511 A1    Dec. 26, 2019

(30) Foreign Application Priority Data

Jun. 22, 2018   (CN) .................. 201810652409.X (51) Int. Cl.
*H01M 4/64* (2006.01)
*H01M 4/04* (2006.01)
*H01M 10/04* (2006.01)

(52) U.S. Cl.
CPC .......... *H01M 4/64* (2013.01); *H01M 4/0435* (2013.01); *H01M 10/0431* (2013.01)

(58) Field of Classification Search
CPC ........ H01M 4/64; H01M 4/667; H01M 4/668; H01M 4/0435; H01M 10/0431
(Continued)

(56) References Cited

U.S. PATENT DOCUMENTS 6,800,398 B1    10/2004    Furuya et al.
2006/0216609 A1*    9/2006    Abe ................. H01M 10/0587
429/246

(Continued)

FOREIGN PATENT DOCUMENTS

CN           101345322 A    1/2009
CN           201815584 U    5/2011
(Continued)

*Primary Examiner* — Sean P Cullen
(74) *Attorney, Agent, or Firm* — Forge IP, PLLC (57) ABSTRACT

The present disclosure provides a secondary battery and an electrode plate. The electrode plate includes a current collector, an active material layer, and a first protective layer. The current collector includes an insulating layer and a conductive layer disposed on the insulating layer. The conductive layer has a main body portion covered by the active material layer and a protrusion portion uncovered by the active material layer. The first protective layer is disposed on a side of the protrusion portion facing away from the insulating layer. The electrode plate further includes a conductive structure, which has a connecting portion fixed on the main body portion, and a first extending portion exceeding an end of the protrusion portion away from the main body portion. The first protective layer is disposed on a side of the connecting portion close to the active material layer along a height direction.

14 Claims, 9 Drawing Sheets

(58) Field of Classification Search
USPC .......................................... 429/209, 233, 244
See application file for complete search history.

(56) References Cited

U.S. PATENT DOCUMENTS

| | | | | | |
|---|---|---|---|---|---|
| 2007/0224493 | A1* | 9/2007 | Higuchi | .............. | H01M 50/572 |
| | | | | | 429/130 |
| 2009/0017376 | A1* | 1/2009 | Yamamura | ............ | H01M 50/50 |
| | | | | | 429/209 |
| 2010/0035144 | A1* | 2/2010 | Oh | ...................... | H01M 50/543 |
| | | | | | 429/164 |
| 2013/0022865 | A1* | 1/2013 | Nishinaka | .............. | H01M 4/668 |
| | | | | | 429/211 |
| 2014/0255778 | A1* | 9/2014 | Huh | ........................ | H01M 4/70 |
| | | | | | 429/211 |
| 2014/0335400 | A1* | 11/2014 | Cherng | ............... | H01M 10/052 |
| | | | | | 429/162 |
| 2017/0047575 | A1* | 2/2017 | Tsuji | .................... | H01M 10/04 |
| 2017/0125791 | A1* | 5/2017 | Fukunaga | ......... | H01M 10/0525 |

FOREIGN PATENT DOCUMENTS

| | | |
|---|---|---|
| CN | 105449160 A | 3/2016 |
| CN | 106058296 A | 10/2016 |
| CN | 107768732 A | 3/2018 |
| JP | 2009104849 A | 5/2009 |
| JP | 2009187675 A | 8/2009 |
| JP | 5937969 B2 | 6/2016 |

\* cited by examiner

FIG. 1

(PRIOR ART)

FIG. 2

(PRIOR ART)

ELECTRODE PLATE INCLUDING CURRENT COLLECTOR HAVING CONDUCTIVE LAYER DISPOSED ON INSULATING LAYER AND PROTECTIVE LAYER DISPOSED ON CONDUTIVE LAYER, AND BATTERY INCLUDING THE SAME

CROSS-REFERENCE TO RELATED APPLICATIONS

The present application claims priority to Chinese Patent Application No. 201810652409.X, filed on Jun. 22, 2018, the content of which is incorporated herein by reference in its entirety.

TECHNICAL FIELD

The present disclosure relates to the technical field of battery, and in particular, relates to a secondary battery and an electrode plate of the secondary battery.

BACKGROUND

Figure 1:
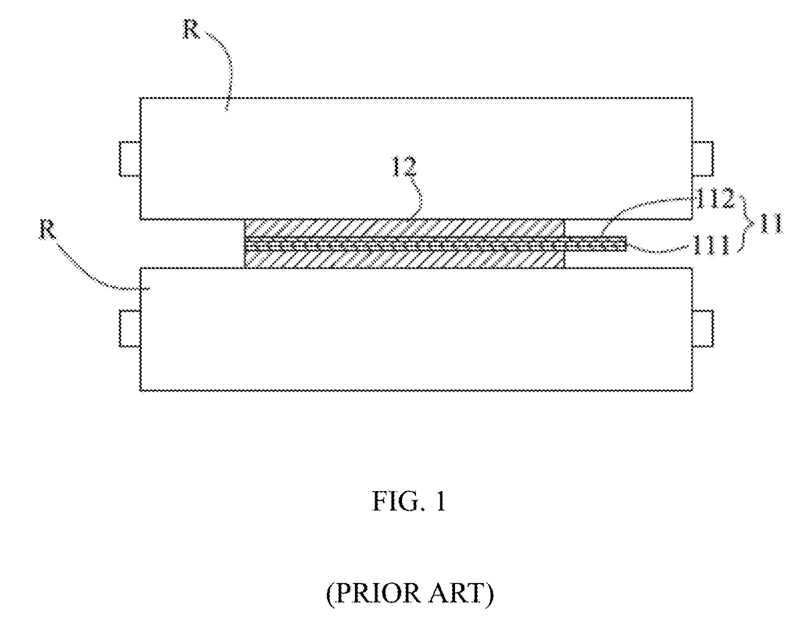
FIG. 1 is a schematic diagram of an electrode plate in an rolling process according to the related art.
Figure 2:
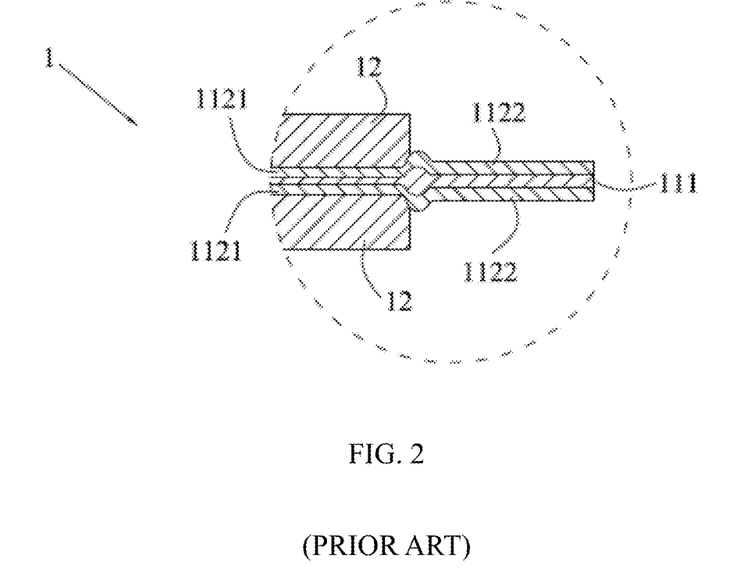
FIG. 2 is a schematic diagram of the electrode plate shown in FIG. 1 after being rolled.

An electrode plate of a secondary battery generally includes a current collector and an active material layer coated on a surface of the current collector. In order to improve safety performance of the secondary battery, an electrode plate 1 can adopt a current collector 11 having a multilayer structure. Referring to FIGS. 1 and 2, the current collector 11 includes an insulating layer 111 and conductive layers 112 provided on both surfaces of the insulating layer 111, and an active material layer 12 is coated on a surface of each conductive layer 112. The conductive layer 112 includes a main body portion 1121 covered by the active material layer 12 and a protrusion portion 1122 protruding from the active material layer 12. The protrusion portion 1122 is connected to an electrode terminal of the secondary battery, and configured to discharge and charge through the electrode terminal. Referring to FIG. 1, after the active material layer 12 is applied to the conductive layer 112, the electrode plate 1 should be rolled to make the active material layer 12 thinner, so as to increase the energy density. However, during the rolling process, a roller R applies force directly on the active material layer 12, but not on the protrusion portion 1122 since the protrusion portion 1122 of the conductive layer 112 is uncoated with the active material layer 12. Referring to FIG. 2, since the insulating layer 111 has a smaller modulus of elasticity than the conductive layer 112, an amount of deformation of the insulating layer 111 is larger than an amount of deformation of the conductive layer 112 under the force of the roller R, which can lead to a bulge of the insulating layer 111 at a juncture between the main body portion 1121 and the protrusion portion 1122. A deformation of bugle on the insulating layer 111 would also result in a bugle of the protrusion portion 1122, so that the protrusion portion 1122 is likely to be bent and crack, thereby degrading the current passing performance of the protrusion portion 1122.

SUMMARY

In view of the problems in the related art, the present disclosure provides a secondary battery and an electrode plate of the secondary battery, aiming to enhance the current passing performance of the electrode plate and improve safety performance.

According to a first aspect of the present disclosure, an electrode plate of a secondary battery is provided. The electrode plate includes: a current collector; an active material layer; and a first protective layer. The current collector includes an insulating layer and a conductive layer disposed on the insulating layer. The conductive layer has a main body portion and a protrusion portion connected to the main body portion. A surface of the main body portion facing away from the insulating layer is covered by the active material layer, and a surface of the protrusion portion facing away from the insulating layer is uncovered by the active material layer. The first protective layer is disposed on a side of the protrusion portion facing away from the insulating layer.

In an embodiment, in a thickness direction of the electrode plate, a surface of the first protective layer facing away from the protrusion portion is lower than a surface of the active material layer facing away from the main body portion.

In an embodiment, in a thickness direction of the electrode plate, a surface of the first protective layer facing away from the protrusion portion is closer to the insulating layer than a surface of the active material layer facing away from the main body portion.

In an embodiment, the first protective layer is connected to the active material layer.

In an embodiment, the first protective layer has a greater hardness than the conductive layer.

In an embodiment, the first protective layer extends to edges of both sides of the protrusion portion in a width direction of the electrode plate, and the first protective layer has a dimension in a range of 0.1 mm to 4 mm along a height direction of the electrode plate.

In an embodiment, the electrode plate further includes a conductive structure. The conductive structure includes a connecting portion and a first extending portion. The connecting portion is fixed on the protrusion portion, and the first extending portion is connected to the connecting portion and extends beyond an end of the protrusion portion away from the main body portion. The first protective layer is disposed on a side of the connecting portion close to the active material layer along a height direction of the electrode plate.

In an embodiment, a gap is reserved between the first protective layer and the connecting portion, and the gap has a dimension of 0.05 mm to 1.5 mm along the height direction.

In an embodiment, the conductive structure further includes a second extending portion, and the second extending portion is connected to an end of the connecting portion close to the main body portion and extends towards the active material layer.

In an embodiment, the second extending portion covers a portion of the first protective layer.

In an embodiment, the connecting portion and the protrusion portion are welded to form a welded zone.

In an embodiment, the electrode plate further includes a second protective layer disposed on a welded zone facing away from the protrusion portion.

According to a second aspect of the present disclosure, a secondary battery is provided. The secondary battery includes an electrode assembly. The electrode assembly includes the electrode plate according to the first aspect.

According to a third aspect of the present disclosure, a secondary battery is provided. The secondary battery includes an electrode assembly. The electrode assembly includes the electrode plate according to the first aspect. A portion of the insulating layer corresponding to the protrusion portion and the protrusion portion form a current guiding portion. The electrode plate has a plurality of current guiding portions and a plurality of conductive structures. The plurality of current guiding portions is stacked, and every two adjacent current guiding portions of the plurality of current guiding portions have a conductive structure of the plurality of conductive structures therebetween.

The technical solutions according to the present disclosure bring following benefits.

REFERENCE SIGNS IN DRAWINGS

| | |
|---|---|
| 1 | electrode plate |
| 11 | current collector |
| 111 | insulating layer |
| 112 | conductive layer |
| 1121 | main body portion |
| 1122 | protrusion portion |
| 12 | active material layer |
| 13 | conductive structure |
| 131 | connecting portion |
| 132 | first extending portion |
| 133 | second extending portion |
| 14 | first protective layer |
| 15 | second protective layer |
| 1A | positive electrode plate |
| 1B | negative electrode plate |
| 2 | case |
| 3 | top cover |
| 4 | electrode terminal |
| 5 | separator |
| 6 | connecting piece |
| P | current guiding portion |
| R | roller |
| W | welded zone |
| X | width direction |
| Y | thickness direction |
| Z | height direction |

DESCRIPTION OF EMBODIMENTS

A secondary battery and an electrode plate of the secondary plate according to the present disclosure will be described in detail with reference to the accompanying drawings.

Figure 4:
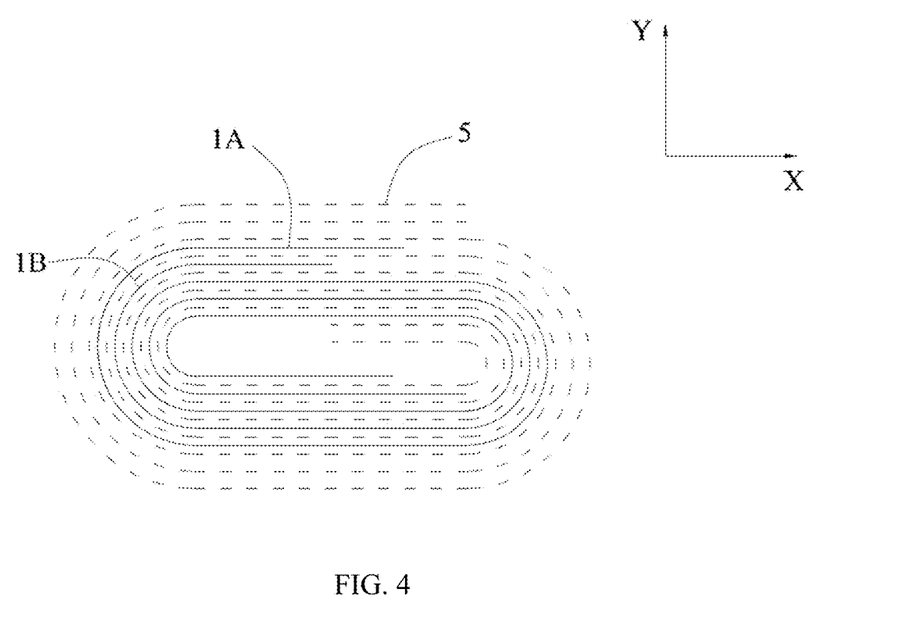
FIG. 4 is a schematic diagram of an electrode plate and separator according to the present disclosure.

Referring to FIG. 4, a secondary battery includes a positive electrode plate 1A, a negative electrode plate 1B and a separator 5. The separator 5 is disposed between the positive electrode plate 1A and the negative electrode plate 1B. The positive electrode plate 1A, the separator 5 and the negative electrode plate 1B are stacked in sequence and wound to form a jelly roll-shaped electrode assembly.

The secondary battery can be a pouch battery in which the electrode assembly formed by winding the positive electrode plate 1A, the separator 5 and the negative electrode plate 1B is packed by a pouch. The pouch can be an aluminum foil.

The secondary battery can be a pouch battery that the electrode assembly formed by winding the positive electrode plate 1A, the separator 5 and the negative electrode plate 1B is packed by a pouch. The pouch can be an aluminum foil.

Figure 3:
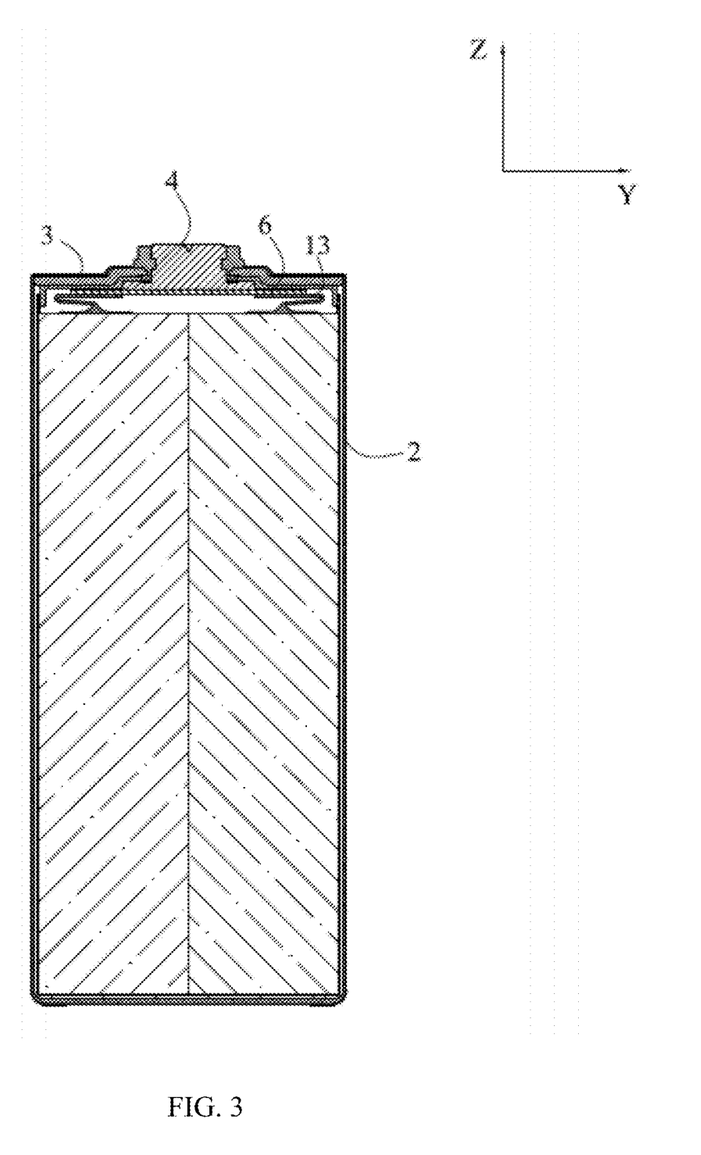
FIG. 3 is a schematic diagram of a secondary battery according to the present disclosure.

The secondary battery can also be a shell battery. As shown in FIG. 3, the secondary battery further includes a case 2, a top cover 3, an electrode terminal 4 and a connecting piece 6. The case 2 can have a hexahedral shape or other shape. A cavity is formed inside the case 2 to accommodate the electrode assembly and electrolyte. The case 2 has an opening at an end through which the electrode assembly can be placed into the cavity of the case 2. The case 2 can be made of a conductive metal material such as aluminum or aluminum alloy, or an insulating material such as plastic. The top cover 3 is provided on the case 2 and covers the opening of the case 2 to seal the electrode assembly within the case 2. The electrode terminal 4 is disposed on the top cover 3. The electrode terminal 4 has an upper end protruding from an upper side of the top cover 3, and a lower end passing through the top cover 3 and extending into the case 2. The connecting piece 6 is disposed in the case 2 and is fixed to the electrode terminal 4. There can be two electrode terminals 4 and two connecting pieces 6. The positive electrode plate 1A is electrically connected to one of the two electrode terminals 4 via one of the two connecting pieces 6, and the negative electrode plate 1B is electrically connected to the other of the two electrode terminals 4 via the other of the two connecting pieces 6.

In the secondary battery, at least one of the positive electrode plate 1A and the negative electrode plate 1B is an electrode plate described below.

Referring to FIGS. 5-8, an electrode plate 1 includes a current collector 11, an active material layer 12, and a first protective layer 14. The current collector 11 includes an insulating layer 111 and a conductive layer 112 disposed on the insulating layer 111. The conductive layer 112 has a main body portion 1121 and a protrusion portion 1122 connected to the main body portion 1121. A surface of the main body portion 1121 facing away from the insulating layer 111 is covered by the active material layer 12, and a surface of the protrusion portion 1122 facing away from the insulating layer 111 is uncovered by the active material layer 12. The first protective layer 14 is disposed on a side of the protrusion portion 1122 facing away from the insulating layer 111.

In an embodiment, the first protective layer 14 is directly disposed on the surface of the protrusion portion 1122 facing away from the insulating layer 111. In another embodiment, the first protective layer 14 is disposed on a surface of a coating, which is applied on the surface of the protrusion portion 1122 facing away from the insulating layer 111.

A portion of the insulating layer 111 corresponding to the protrusion portion 1122 together with the protrusion portion 1122 forms a current guiding portion P. The electrode plate 1 can include a plurality of current guiding portions P. Once the electrode assembly is formed by winding the electrode plate 1, the plurality of current guiding portions P is stacked.

Since the current collector 11 of the electrode plate 1 is provided with the insulating layer 111, the thickness of the conductive layer 112 can be reduced. When a foreign matter pierces the electrode plate 1, due to the small thickness of the conductive layer 112, burr produced at a position of the conductive layer 112 where it is pierced by the foreign matter is too small to pierce a separator 5, thereby avoiding a short circuit and improving the safety performance. In addition, the first protective layer 14 has enough strength to support the protrusion portion 1122 and protect the protrusion portion 1122 from being deformed, thereby preventing the conductive layer 112 from being broken and enhancing the current passing performance of the electrode plate 1.

Figure 8:
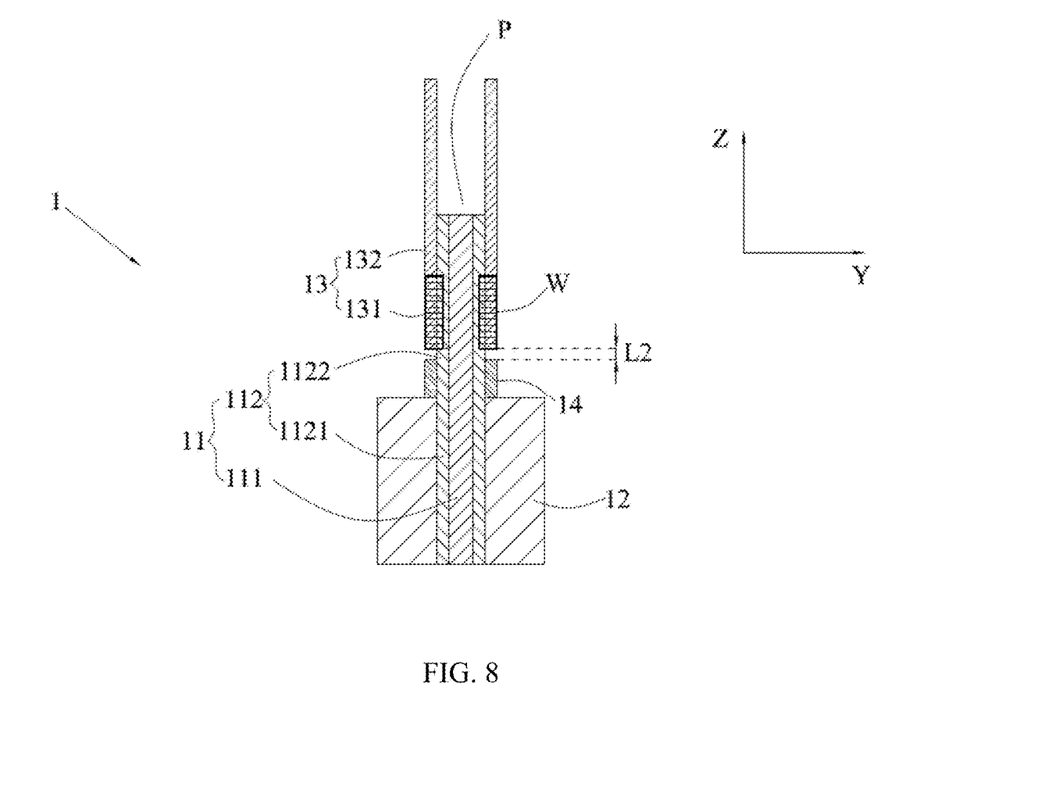
FIG. 8 is a section view along line A-A shown in FIG. 7.

Referring to FIG. 8, in a thickness direction Y of the electrode plate, a surface of the first protective layer 14 facing away from the protrusion portion 1122 is lower than a surface of the active material layer 12 facing away from the main body portion 1121, that is, the surface of the first protective layer 14 facing away from the protrusion portion 1122 is closer to the insulating layer than the surface of the active material layer 12 facing away from the main body portion 1121, so that the first protective layer 14 will not result in an increase in an overall thickness of the electrode plate 1, guaranteeing the energy density of the secondary battery. In addition, such arrangement can also prevent a roller R from applying force on the first protective layer 14 when rolling the active material layer 12, and thus protect the first protective layer 14 from being damaged by the roller R.

The first protective layer 14 includes a binder and an insulating material. The insulating material includes at least one of aluminum oxide and aluminium oxyhydroxide. The binder and the insulating material are mixed to prepare a slurry. The slurry is applied on a surface of the protrusion portion 1122, so as to form the first protective layer 14 after curing of the slurry.

The first protective layer 14 is disposed at an end of the protrusion portion 1122 close to the main body portion 1121. In an embodiment, the first protective layer 14 is connected to the active material layer 12, such that the first protective layer 14 is fixed on the active material layer 12 and a bonding force between the first protective layer 14 and the active material layer 12, thereby preventing the first protective layer 14 and the active material layer 12 from peeling off together. In this case, an end of the first protective layer 14 is connected to the active material layer 12, such that the first protective layer 14 covers the juncture between the protrusion portion 1122 and the main body portion 1121, thereby protecting the conductive layer 112 from being broken and thus enhancing the current passing performance of the electrode plate 1. The slurry can also be applied on the end of the active material layer 12 in order to cover the juncture.

The first protective layer 14 has a greater hardness than the conductive layer 112, and in this regards, the first protective layer 14 can further limit the deformation of the protrusion portion 1122 and thus prevent the protrusion portion 1122 from being broken, thereby enhancing the current passing performance of the electrode plate 1.

Figure 7:
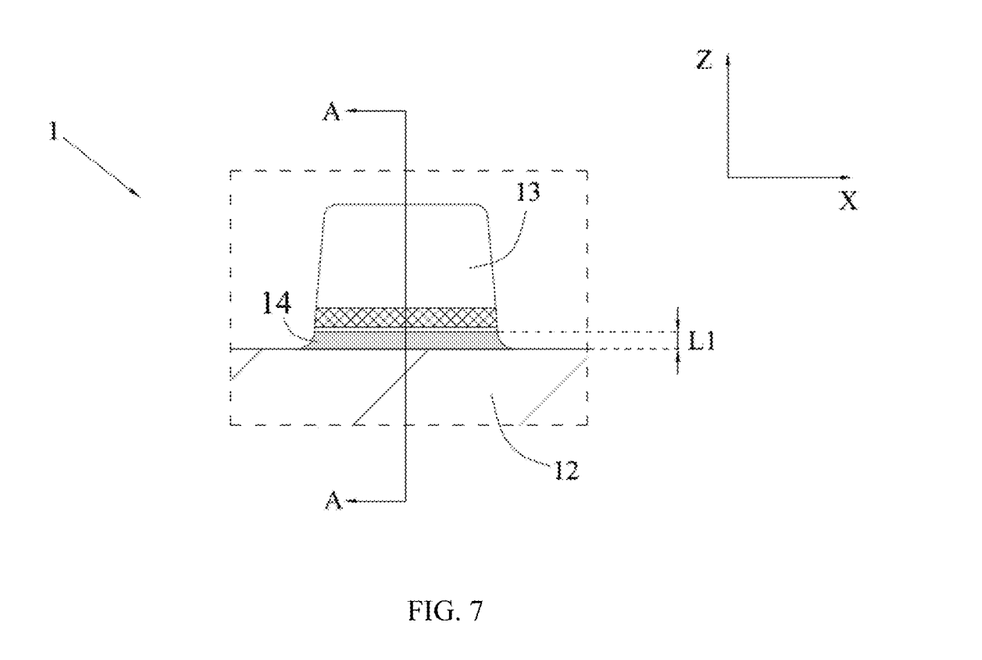
FIG. 7 is an enlarged view of the dotted frame shown in FIG. 6.

Referring to FIG. 7, the first protective layer 14 extends to edges of both sides of the protrusion portion 1122 in a width direction X of the electrode plate, so as to maximize a coverage area of the first protective layer 14 and improve the deformation-preventing effect of the first protective layer 14.

The first protective layer 14 has a dimension L1 in a range of 0.1 mm to 4 mm along a height direction Z of the electrode plate. If the dimension L1 of the first protective layer 14 is smaller than 0.1 mm, the bonding force between the first protective layer 14 and the protrusion portion 1122 is too weak, such that the first protective layer 14 is likely to peel off. Moreover, the coverage area is too small to limit the deformation of the protrusion portion 1122, which may result in a breakage of the conductive layer 112. In the secondary battery, as shown in FIG. 3, the protrusion portion 1122 (as well as the conductive structure described below) is required to be bent to reduce space occupied by the protrusion portion 1122 in the height direction Z, and thus the energy density of the secondary battery can be improved. Since the first protective layer 14 has a greater hardness, a segment of the protrusion portion 1122 covered by the first protective layer 14 is not bendable. In this regards, if the dimension L1 of the first protective layer 14 is larger than 4 mm, the bendable segment of the protrusion portion 1122 will be shorter, and thus the protrusion portion 1122 will occupy too much space, thereby reducing the energy density of the secondary battery.

Figure 5:
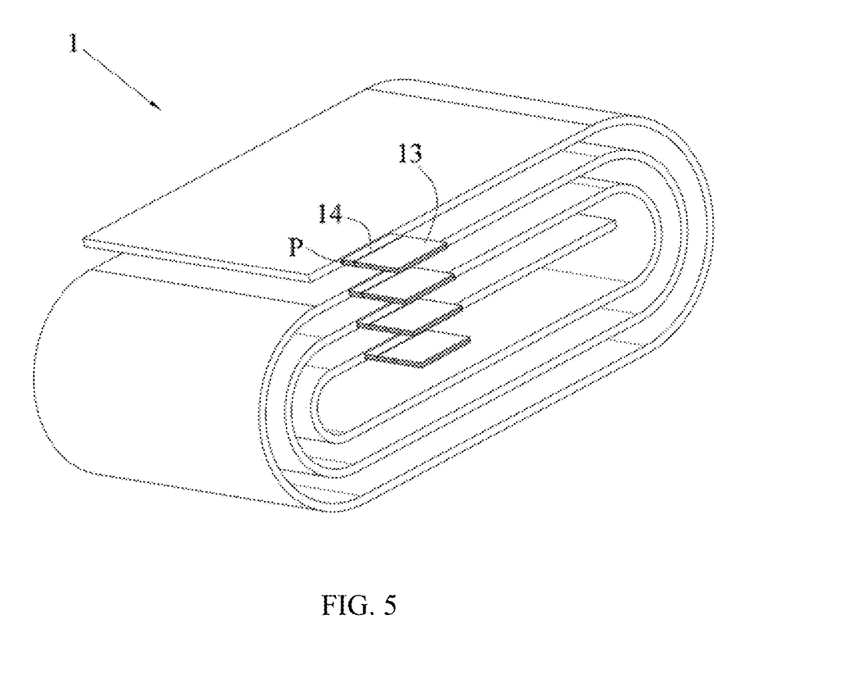
FIG. 5 is another schematic diagram of an electrode plate according to the present disclosure.
Figure 6:
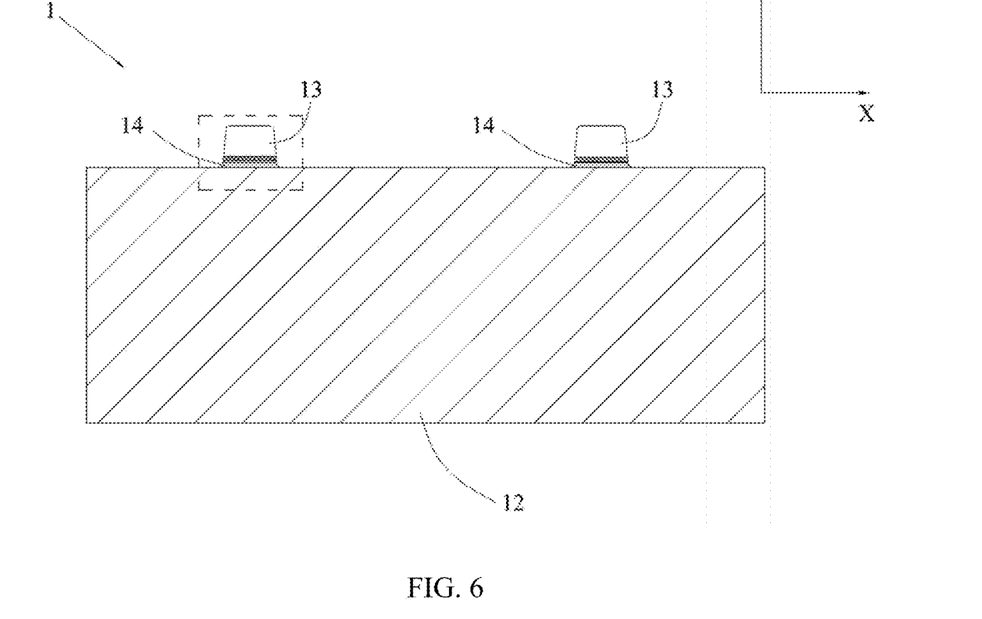
FIG. 6 is yet another schematic diagram of an electrode plate according to the present disclosure.

Referring to FIG. 8, the electrode plate 1 further includes a conductive structure 13. The conductive structure 13 includes a connecting portion 131 and a first extending portion 132. The connecting portion 131 is fixed on the main body portion 1121. The first extending portion 132 is connected to the connecting portion 131 and extends beyond an end of the protrusion portion 1122 away from the main body portion 1121. The conductive layers 112 disposed on both sides of the insulating layer 111 along the thickness direction Y are provided with conductive structures 13. Referring to FIG. 5, the electrode plate 1 can include a plurality of conductive structures 13. Once the electrode plate 1 is formed by winding, the plurality of conductive structures 13 is opposed to each other, and each two adjacent current guiding portions P have a conductive structure 13 located therebetween. The first extending portions of the plurality of conductive structures 13 are welded together, in order to converge current on the conductive layers 112 on the both sides of the insulating layer 111. Referring to FIG. 3, the first extending portions of the plurality of conductive structures 13 are welded to a connecting piece 6, so that current on the electrode plate 1 can flow to the outside via the connecting piece 6 and the electrode terminal 4.

The first protective layer 14 is disposed on a side of the connecting portion 131 close to the active material layer 12 along a height direction Z. Since the protrusion portion 1122 and the connecting portion 131 are in a firm connection and thus crack is unlikely to occur, the first protective layer 14 only needs to cover the region between the connecting portion 131 and the active material layer 12.

The electrode plate 1 can be formed according to following steps of:
1. applying the active material layer 12 on a surface of the conductive layer 112 of the current collector 11, and applying the slurry on the surface of the conductive layer 112 of the current collector 11, so as to form, after curing of the slurry, the first protective layer 14 to be cut;
2. rolling the active material layer 12 to compact the active material layer 12;
3. performing cutting to get the protrusion portion 1122 in a desired shape, the portion of insulating layer 111 corresponding to the protrusion portion 1122 and the first protective layer 14; and
4. welding the conductive structure 13 to the protrusion portion 1122.

The conductive layer 112 fully covers both surfaces of the insulating layer 111. The insulating layer 111 has a thickness of 1 μm to 20 μm. The conductive layer 112 has a thickness of 0.1 μm to 10 μm. The conductive structure 13 has a thickness of 6 μm to 15 μm. Since the conductive layer 112 is relatively thin, burr formed on the conductive layer 112 during the cutting process is too small to pierce the separator 5 having a thickness of dozens of micrometers, thereby avoiding a short circuit and improving safety performance.

Referring to FIG. 8, a gap is reserved between the first protective layer 14 and the connecting portion 131, and the gap has a dimension L2 of 0.05 mm to 1.5 mm along the height direction Z. Both the coating process of the first protective layer 14 and the welding process of the conductive structure 13 have inevitable dimensional errors. In this regards, if no gap is reserved between the first protective layer 14 and the connecting portion 131, the connecting portion 131 may be connected to the first protective layer 14 due to the errors, which may lead to an inclination of the connecting portion 131 and a deficient welding and thus shorten the service life of the secondary battery. In addition, since the first protective layer 14 has a greater hardness, the first protective layer 14 may damage the welding device.

If the dimension L2 of the gap along the height direction Z is smaller than 0.05 mm, the connecting portion 131 may also be connected to the first protective layer 14 due to the errors. If the dimension L2 of the gap along the height direction Z is larger than 1.5 mm, when bending the protrusion portion 1122, a part of the protrusion portion 1122 corresponding to the gap may form a fold, which is likely to cause the breakage of the conductive layer 112.

Figure 9:
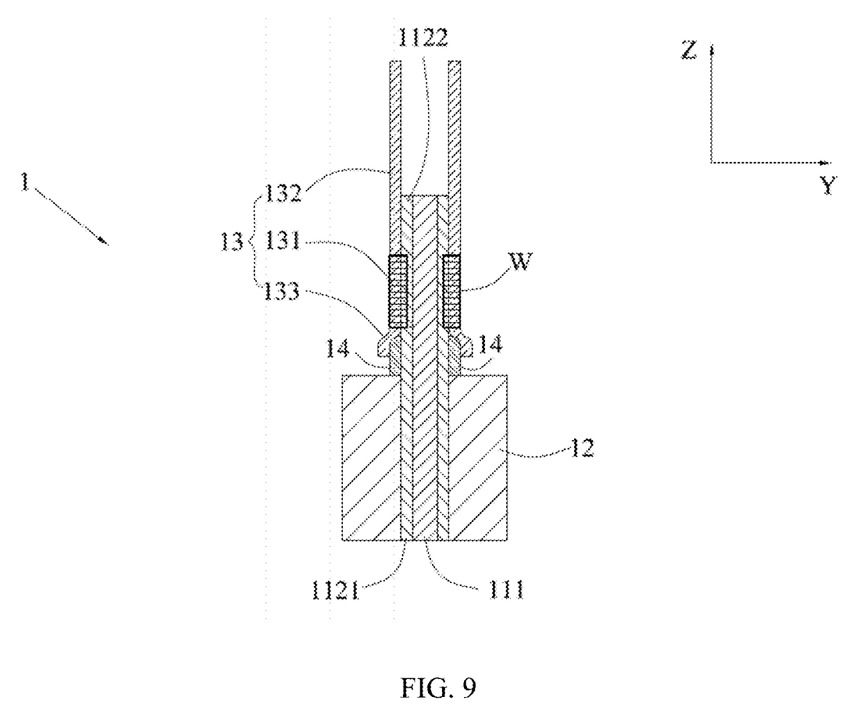
FIGS. 9 to 11 are schematic diagrams of electrode plates according to several embodiments of the present disclosure.

Referring to FIG. 9, the conductive structure 13 further includes a second extending portion 133. The second extending portion 133 is connected to an end of the connecting portion 131 close to the main body portion 1121 and extends towards the active material layer 12. The connecting portion 131 of the conductive structure 13, as a whole, is welded to the protrusion portion 1122. If the second extending portion 133 is omitted, the welding has to be performed along the edge of the conductive structure 13, which requires a high accuracy of positioning.

However, by providing the second extending portion 133, the welded zone W of the conductive structure 13 can be positioned flexibly, without requiring an alignment welding, thereby lowering a requirement on the accuracy of positioning.

Since the gap reserved between the first protective layer 14 and the connecting portion 131 only has the dimension L2 of 0.05 mm to 1.5 mm along the height direction Z, the improvement effect on the welding process is limited if the extension of the second extending portion 133 is restricted in the range of the gap. Therefore, the second extending portion 133 can cover a part of the first protective layer 14, in order to ensure a sufficient width of the second extending portion 133.

Figure 10:
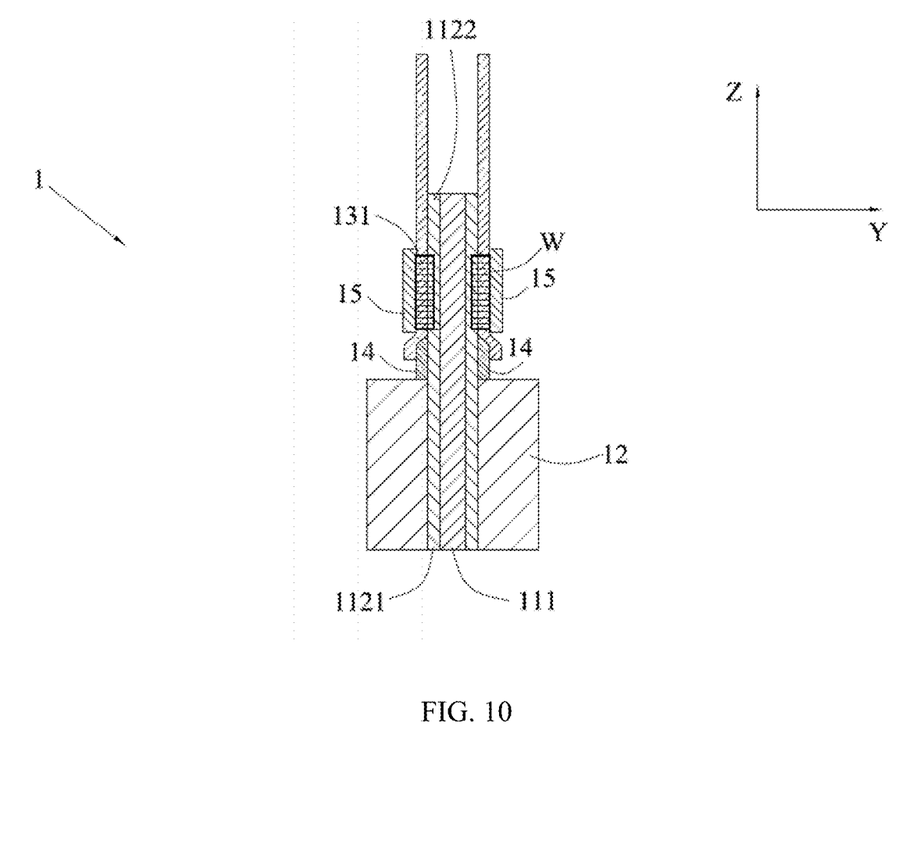

When welding the conductive structure 13 and the protrusion portion 1122, the connecting portion 131 of the conductive structure 13 and a part of the protrusion portion 1122 that is in contact with the connecting portion 131 are melted and joined together, and a welded zone W is formed after solidification. In this way, the conductive structure 13 and protrusion portion 1122 can be connected with one another. Referring to FIG. 10, the electrode plate 1 further includes a second protective layer 15 disposed on a surface of the welded zone W facing away from the protrusion portion 1122. Since the connecting portion 131 is connected to the protrusion portion 1122 by welding, the surface of the welded zone W facing away from the protrusion portion 1122 may be rough and may pierce the separator 5, causing a short circuit. However, the second protective layer 15 can be arranged to separate the separator 5 from the surface of the welded zone W, thereby preventing the separator 5 from being pierced and thus improving the safety performance.

Figure 11:
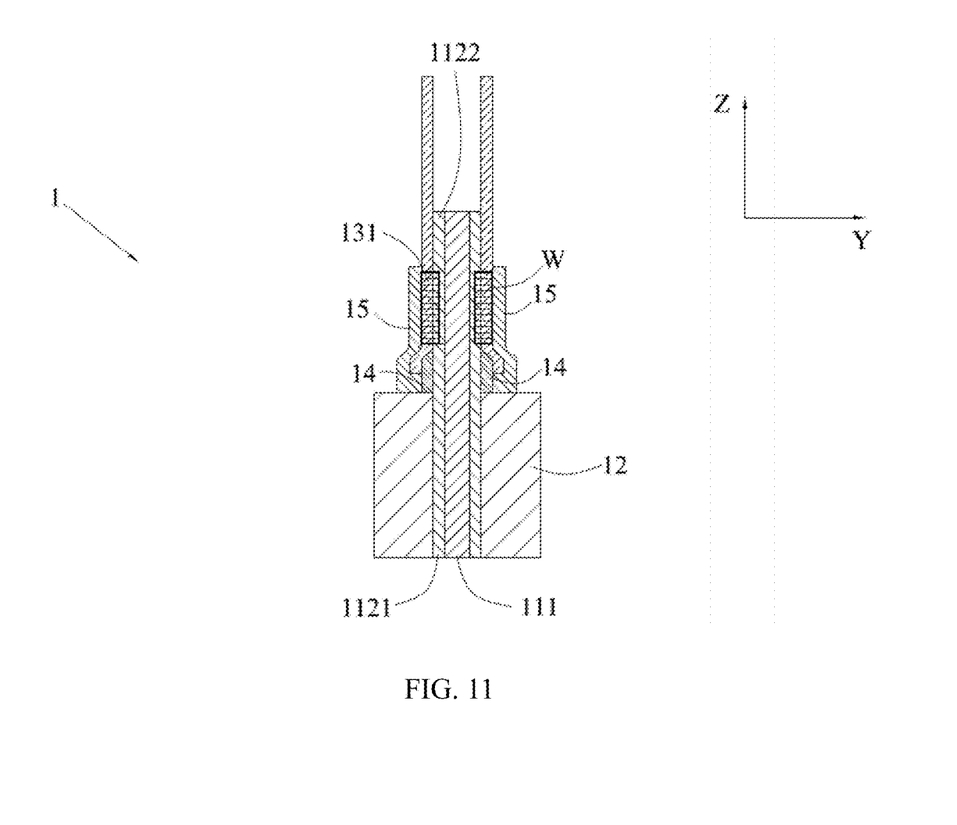

The first protective layer 14 and the second protective layer 15 can be made of a same material or different materials. After the conductive structure 13 is welded on the protrusion portion 1122, a slurry is applied on the welded zone W and the second protective layer 15 is formed after curing. In an embodiment, as shown in FIG. 11, the first protective layer 14 and the second protective layer 15 are connected as a whole.

In an embodiment according to the present disclosure, the positive electrode plate 1A is the electrode plate 1 as described above, and the negative electrode plate 1B has a conventional structure known in the related art (i.e., which is formed by partially covering a copper foiling by an negative active material layer and performing cutting on a portion of the copper foil uncovered by the negative active material layer to form a negative tab).

In this case, the insulating layer 111 can be made of a polyethylene terephthalate (PET) film or a polypropylene (PP) film, the conductive layer 112 and the conductive structure 13 can be made of aluminum, and the active material layer 12 includes a positive active material (such as lithium cobalt oxide, etc.). The insulating layer 111 has a smaller elastic modulus than the conductive layer 112.

In order to avoid lithium precipitation, the negative electrode plate 1B is required to have a larger width than the positive electrode plate 1A. When the positive electrode plate 1A and the negative electrode plate 1B are wound together, a part of the protrusion portion 1122 of the positive electrode plate 1A overlaps with the negative active material layer of the negative electrode plate 1B, and thus overlaps with a cutting edge of the copper foil. The burr produced at the cutting edge of the copper foil may puncture the separator 5.

The negative electrode plate 1B usually extends beyond the positive electrode plate by 1.5 mm. In this regards, the segment of the protrusion portion 1122 located between the welded zone W and the active material layer 12 needs to have a width greater than 1.5 mm. In this case, the burr on the copper foil overlaps with the segment of the protrusion portion 1122 located between the welded zone W and the active material layer 12. Since the segment of the protrusion portion 1122 is covered by the insulating first protective layer 14, the burr, even after piercing the separator 5, will only contact the first protective layer 14 without causing a short circuit. In addition, if the segment of the protrusion portion 1122 located between the welded zone W and the active material layer 12 has a relative larger width, a total length of the conductive structure 13 and the protrusion portion 1122 may be too large. In this case, referring to FIG. 3, the conductive structure 13 may occupy space of the battery in the thickness direction Y after being bent. Therefore, as an example, the segment of the protrusion portion 1122 located between the welded zone W and the active material layer 12 can have a width in a range of 1.5 mm to 6 mm.

Further, if the second extending portion 133 completely covers the first protective layer 14, the burr on the copper foil will contact the second extending portion 133 after penetrating the separator 5, which may lead to the short circuit. Therefore, as an example, the second extending portion 133 can only cover a part of the first protective layer 14.

What is claimed is:

1. An electrode plate (1) of a secondary battery, comprising:

a current collector (11);
an active material layer (12);
two conductive structures (13); and
a first protective layer (14),
wherein the current collector (11) comprises an insulating layer (111) and a conductive layer (112) disposed on each of two opposite surfaces of the insulating layer (111), the conductive layer (112) has a main body portion (1121) and a protrusion portion (1122) connected to the main body portion (1121), a surface of the main body portion (1121) facing away from the insulating layer (111) is covered by the active material layer (12), and a surface of the protrusion portion (1122) facing away from the insulating layer (111) is uncovered by the active material layer (12),
wherein the first protective layer (14) is disposed on a side of the protrusion portion (1122) facing away from the insulating layer (111),
wherein one conductive structure of the two conductive structures (13) is connected to the protrusion portion (1122) located on one of the two opposite surfaces of the insulating layer (111), and another conductive structure of the two conductive structures (13) is connected to the protrusion portion (1122) located on another one of the two opposite surfaces of the insulating layer (111),
wherein each of the two conductive structures (13) comprises a connecting portion (131), a first extending portion (132), and a second extending portion (133), the connecting portion (131) is fixed on the protrusion portion (1122), and the first extending portion (132) is connected to the connecting portion (131) and extends beyond an end of the protrusion portion (1122) away from the main body portion (1121), the second extending portion (133) is connected to an end of the connecting portion (131) facing away from the first extending portion (132) and extends towards the active material layer (12), and the second extending portion (133) covers a portion of the first protective layer (14), and
wherein the first protective layer (14) is disposed between the connecting portion (131) and the active material layer (12) along a height direction (Z) of the electrode plate (1), and is directly connected to the active material layer (12), wherein a gap is reserved between the first protective layer (14) and the connecting portion (131) along the height direction (Z).

2. The electrode plate (1) according to claim 1, wherein the first protective layer (14) has a greater hardness than the conductive layer (112).

3. The electrode plate (1) according to claim 1, wherein the gap has a dimension (L2) of 0.05 mm to 1.5 mm.

4. The electrode plate (1) according to claim 1, wherein the connecting portion (131) and the protrusion portion (1122) are welded to form a welded zone (W).

5. The electrode plate (1) according to claim 4, further comprising a second protective layer (15) disposed on the welded zone (W) facing away from the protrusion portion (1122).

6. The electrode plate (1) according to claim 1, wherein in a thickness direction (Y) of the electrode plate (1), a surface of the first protective layer (14) facing away from the protrusion portion (1122) is lower than a surface of the active material layer (12) facing away from the main body portion (1121).

7. The electrode plate (1) according to claim 1, wherein in a thickness direction (Y) of the electrode plate (1), a surface of the first protective layer (14) facing away from the protrusion portion (1122) is closer to the insulating layer (111) than a surface of the active material layer (12) facing away from the main body portion (1121).

8. The electrode plate (1) according to claim 1, wherein the first protective layer (14) extends to edges of both sides of the protrusion portion (1122) in a width direction (X) of the electrode plate (1), and the first protective layer (14) has a dimension (L1) in a range of 0.1 mm to 4 mm along the height direction (Z) of the electrode plate (1).

9. A secondary battery, comprising an electrode assembly, wherein the electrode assembly comprises the electrode plate (1) according to claim 1, and
wherein the electrode plate (1) has a plurality of current guiding portions (P) and a plurality of conductive structures (13), the plurality of current guiding portions (P) is stacked, and every two adjacent current guiding portions (P) of the plurality of current guiding portions (P) have a conductive structure (13) of the plurality of conductive structures (13) therebetween,
wherein each of the plurality of conductive structures (13) comprises the connecting portion (131) and the first extending portion (132), and
wherein each of the plurality of current guiding portions (P) is formed by the protrusion portion (1122) and a portion of the insulating layer (111) corresponding to the protrusion portion (1122).

10. A secondary battery, comprising an electrode assembly, wherein the electrode assembly comprises an electrode plate (1), the electrode plate (1) comprising:
a current collector (11);
an active material layer (12);
two conductive structures (13); and
a first protective layer (14),
wherein the current collector (11) comprises an insulating layer (111) and a conductive layer (112) disposed on each of two opposite surfaces of the insulating layer (111), the conductive layer (112) has a main body portion (1121) and a protrusion portion (1122) connected to the main body portion (1121), a surface of the main body portion (1121) facing away from the insulating layer (111) is covered by the active material layer (12), and a surface of the protrusion portion (1122) facing away from the insulating layer (111) is uncovered by the active material layer (12),
wherein the first protective layer (14) is disposed on a side of the protrusion portion (1122) facing away from the insulating layer (111),
wherein one conductive structure of the two conductive structures (13) is connected to the protrusion portion (1122) located on one of the two opposite surfaces of the insulating layer (111), and another conductive structure of the two conductive structures (13) is connected to the protrusion portion (1122) located on another one of the two opposite surfaces of the insulating layer (111),
wherein each of the two conductive structures (13) comprises a connecting portion (131), a first extending portion (132), and a second extending portion (133), the connecting portion (131) is fixed on the protrusion portion (1122), and the first extending portion (132) is connected to the connecting portion (131) and extends beyond an end of the protrusion portion (1122) away from the main body portion (1121), the second extending portion (133) is connected to an end of the connecting portion (131) facing away from the first extending portion (132) and extends towards the active material layer (12), and the second extending portion (133) covers a portion of the first protective layer (14), and wherein the first protective layer (14) is disposed between the connecting portion (131) and the active material layer (12) along a height direction (Z) of the electrode plate (1), and is directly connected to the active material layer (12), wherein a gap is reserved between the first protective layer (14) and the connecting portion (131) along the height direction (Z).

11. The secondary battery according to claim 10, wherein the first protective layer (14) has a greater hardness than the conductive layer (112).

12. The secondary battery according to claim 10, wherein in a thickness direction (Y) of the electrode plate (1), a surface of the first protective layer (14) facing away from the protrusion portion (1122) is lower than a surface of the active material layer (12) facing away from the main body portion (1121).

13. The secondary battery according to claim 10, wherein in a thickness direction (Y) of the electrode plate (1), a surface of the first protective layer (14) facing away from the protrusion portion (1122) is closer to the insulating layer (111) than a surface of the active material layer (12) facing away from the main body portion (1121).

14. The secondary battery according to claim 10, wherein the first protective layer (14) extends to edges of both sides of the protrusion portion (1122) in a width direction (X) of the electrode plate (1), and the first protective layer (14) has a dimension (L1) in a range of 0.1 mm to 4 mm along the height direction (Z) of the electrode plate (1).

* * * * *